(12) United States Patent
Kato (10) Patent No.: US 7,616,958 B2
(45) Date of Patent: Nov. 10, 2009

(54) METHOD FOR SETTING CELL INFORMATION IN RADIO ACCESS NETWORK

(75) Inventor: Hidenori Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 534 days.

(21) Appl. No.: 10/538,667

(22) PCT Filed: Dec. 1, 2003

(86) PCT No.: PCT/JP03/15321

§ 371 (c)(1),
(2), (4) Date: Jun. 10, 2005

(87) PCT Pub. No.: WO2004/054308

PCT Pub. Date: Jun. 24, 2004

(65) Prior Publication Data

US 2006/0014541 A1 Jan. 19, 2006

(30) Foreign Application Priority Data

Dec. 12, 2002 (JP) ............................. 2002-360991

(51) Int. Cl.
*H04W 40/00* (2009.01)
*H04W 4/00* (2009.01)
*H04B 1/38* (2006.01)
(52) U.S. Cl. ...................... 455/446; 455/560; 370/338; 709/231
(58) Field of Classification Search ................. 455/560, 455/422.1, 418, 433, 435.1, 445, 446, 448; 370/338, 229, 395.2, 395.5, 395.71, 328, 370/400, 401, 351; 709/230, 231, 238, 239
See application file for complete search history.

(56) References Cited

U.S. PATENT DOCUMENTS 6,879,820 B2 * 4/2005 Bjelland et al. ............. 455/406

(Continued)

FOREIGN PATENT DOCUMENTS

JP 2001-359139 A 12/2001

(Continued)

OTHER PUBLICATIONS

Mobile Wireless Internet Forum, OpenRAN Architecture in $3^{rd}$ Generation Mobile Systems, Technical Report MTR-007; Sep. 4, 2001, pp. 1-64.

(Continued)

*Primary Examiner*—George Eng
*Assistant Examiner*—Marcos L Torres
(74) *Attorney, Agent, or Firm*—Foley & Lardner LLP (57) ABSTRACT

Disclosed is a method of easily and reliably setting cell information in a control-plane processing device and a user-plane processing device in a radio access network, wherein the radio access network is provided with a radio network controller, which is divided into a control-plane processing device and a user-plane processing device. The control-plane processing device (11) holds in advance the cell information to be held in common with each of the user-plane processing devices ($12_1$ to $12_N$) that are under control of the control-plane processing device. Each of the user-plane processing devices ($12_1$ to $12_N$) requests the cell information from the control-plane processing device (11), for example, at a startup time. The control-plane processing device (11) notifies the cell information to be held in common with the relevant user-plane processing device to the user-plane processing device that has requested the cell information.

26 Claims, 4 Drawing Sheets

11: C-plane processing device
12: U-plane processing device
13: NodeB
14: Router
15: Core Network (CN)

U.S. PATENT DOCUMENTS

| | | |
|---|---|---|
| 6,912,390 B2 * | 6/2005 | Andersson et al. .......... 455/436 |
| 2002/0089993 A1 | 7/2002 | Suumaki et al. |
| 2003/0224826 A1 | 12/2003 | Sakata et al. |
| 2004/0127258 A1 | 7/2004 | Taketsugu |
| 2006/0014541 A1 | 1/2006 | Kato |

FOREIGN PATENT DOCUMENTS

| | | |
|---|---|---|
| JP | 2002-218533 A | 8/2002 |
| JP | 2003-348661 A | 12/2003 |
| JP | 2004-194015 A | 7/2004 |
| JP | 2004-194072 A | 7/2004 |
| JP | 2004-194073 A | 7/2004 |
| JP | 2004-194086 A | 7/2004 |
| WO | WO 2004/054307 A1 | 5/2004 |
| WO | WO 2004/054292 A1 | 6/2004 |

OTHER PUBLICATIONS

Kalliokulju, J., "User Plane Architecture of 3$^{rd}$ Generation Mobile", Telecommunication Network Networks, (ICON' 99), Proceedings, IEEE Intl. Conf., pp. 270-278 (Sep. 28-Oct. 1, 1999).

Kempf, J., ed., "Open RAN Architecture in 3$^{rd}$ Generation Mobile Systems", Mobile Wireless Internet Forum Technical Report, Mobile Wireless Internet Forum, pp. 1-64 (Jun. 12, 2001).

* cited by examiner

PRIOR ART

11: C-plane processing device

12: U-plane processing device

13: NodeB

14: Router

15: Core Network (CN)

| cell information | cell #1 | cell #2 |
|---|---|---|
| Cell ID | A | A' |
| Local Cell ID | B | B' |
| MCC | C | C |
| MNC | D | D |
| LAC | E | E' |

(b)

| cell information | cell #1 | cell #2 | cell #3 |
|---|---|---|---|
| Cell ID | A | A' | A" |
| Local Cell ID | B | B' | B" |
| MCC | C | C | C |
| MNC | D | D | D |
| LAC | E | E | E" |

METHOD FOR SETTING CELL INFORMATION IN RADIO ACCESS NETWORK

TECHNICAL FIELD

The present invention relates to a radio access network, and more particularly to setting of information in a radio access network.

BACKGROUND ART

As a global standard of mobile phones, 3GPP (3rd Generation Partnership Project) defines the standards of the WCDMA communication system. The architecture and functionality of the WCDMA communication system have been variously stipulated (for example, cf. Mobile Wireless Internet Forum, Open RAN Architecture in 3rd Generation Mobile Systems Technical Report MTR-007 Release v1, 0.0(12 Jun. 2001.))

Figure 1:
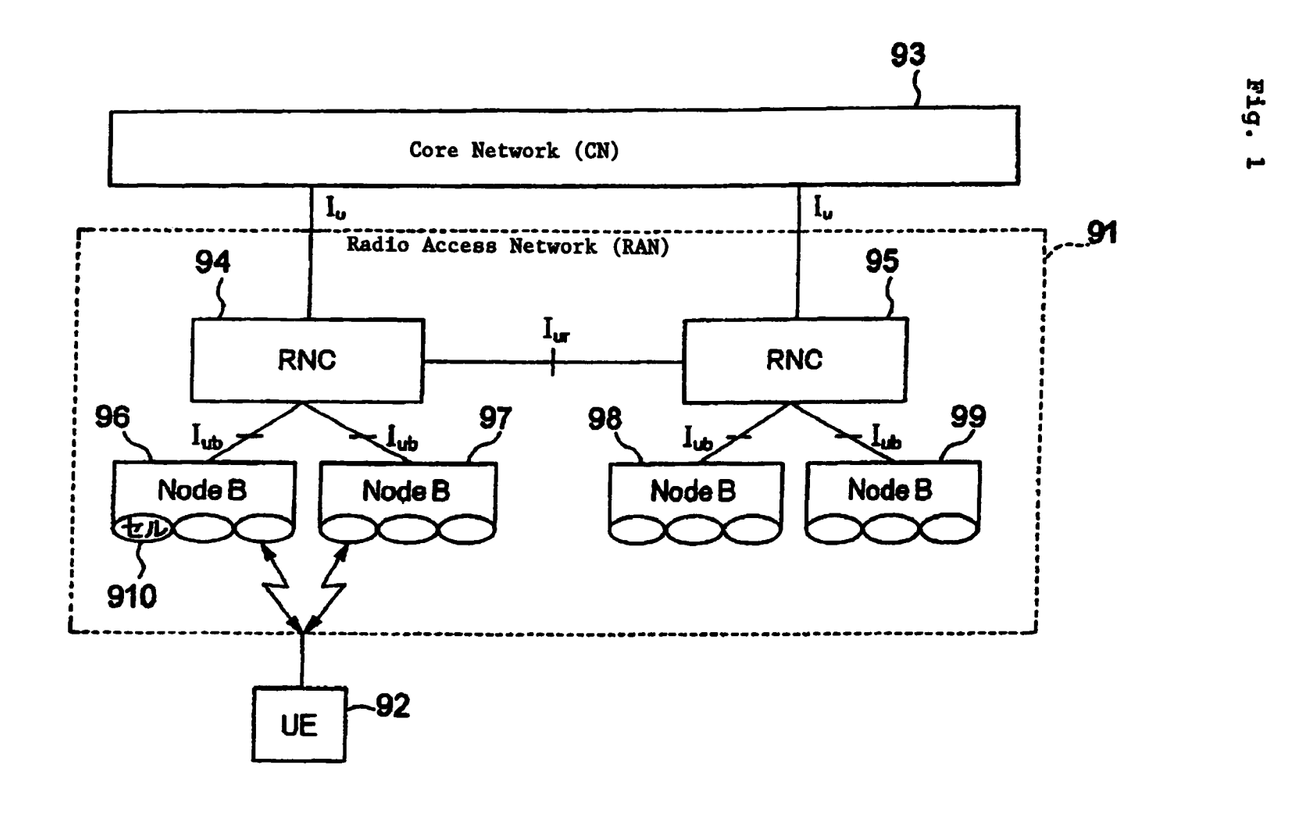
FIG. 1 is a diagram illustrating the architecture of the WCDMA communication system defined in the 3GPP.

FIG. 1 is a diagram illustrating the architecture of the WCDMA communication system stipulated in the 3GPP.

The WCDMA communication system has an architecture in which RAN (Radio Access Network) 91 is connected with CN (Core Networks) 93 that provides a circuit switching or packet switching service in its own network.

RAN 91 has at least one (two in FIG. 1) radio network controller (RNC) 94, 95 and at least one (four in FIG. 1) NodeB (radio base station) 96 to 99.

RNCs 94, 95 are connected with CN 93 through the Iu interface. In addition, RNCs 94, 95 are interconnected through the Iur interface. Further, each of NodeBs 96 to 99 is connected to any one of RNCs through the Iub interface.

Each of NodeBs 96 to 99 covers at least one cell 910 and is connected to User Equipment (UE: radio mobile station) 92 through the wireless interface. Each of NodeBs 96 to 99 terminates the wireless interface and transmits user data to RNC.

RNC 94, 95 sends and receives control signals for signaling control with UE 92 though any one of NodeBs to deal with establishing or releasing a call. RNC 94, 95 controls NodeBs under control thereof to send and receive user data with UEs.

Figure 4:
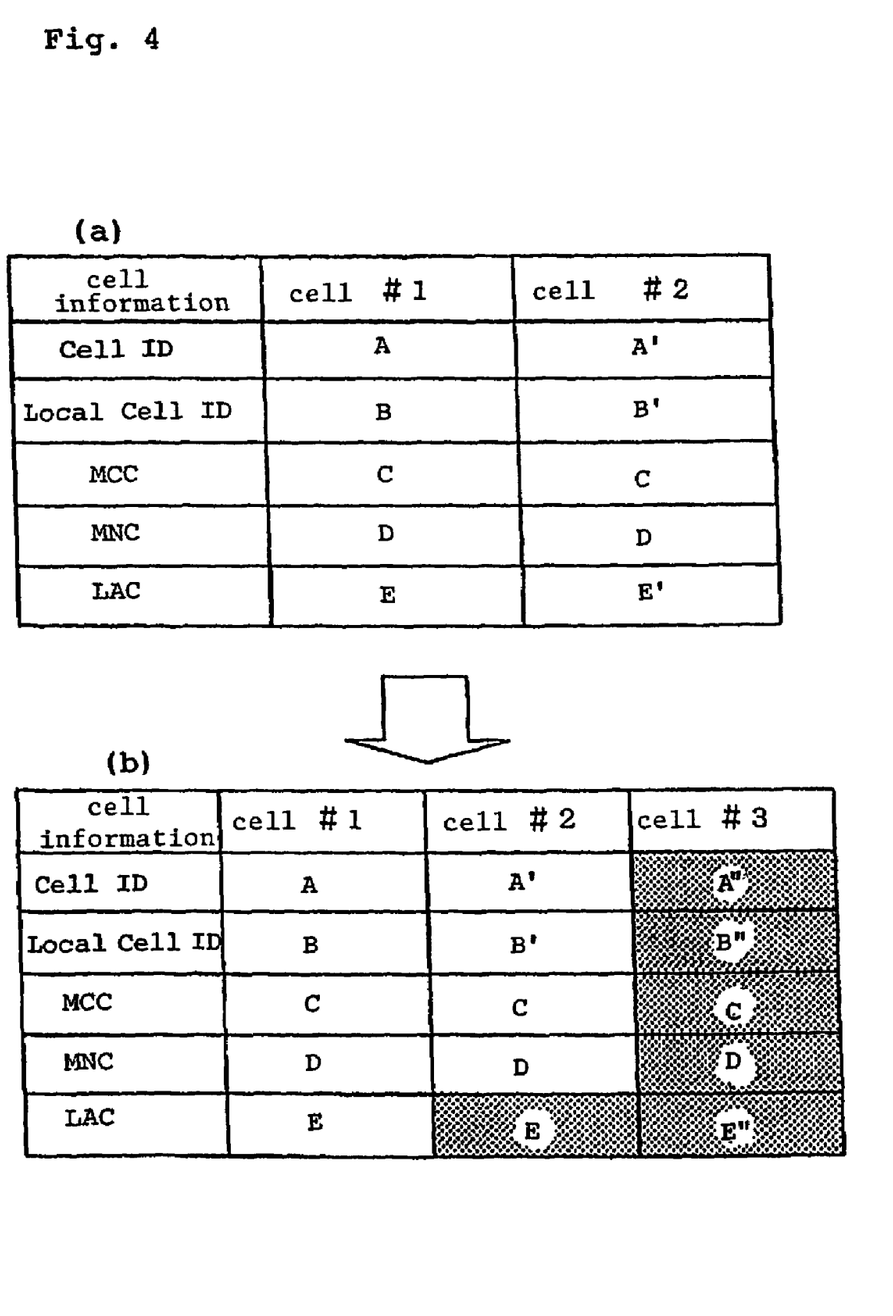
FIG. 4 is a diagram illustrating an aspect of the memory table on which cell information is deployed.

In the WCDMA communication system in the 3GPP system as shown in FIG. 4, RNC 94, 95 has both the function of Control plane (C-plane), which deals with a control signal and the function of User plane (U-plane), which processes user data. As a result, when enhancing the processing capability of the C-plane is required, it is necessary to establish a new RNC, in addition to the existing RNCs, even if no enhancement of the processing capability of the C-plane is required, which potentially entails a redundant increase in a system cost.

In contrast, a radio access network has been intended in which the process of the C-plane and the process of the U-plane are allocated to separate devices and freedom of the system architecture is increased to appropriately define the processing capabilities of the C-plane and the U-plane properly defined and to provide an optimally adapted architecture for the system requirement.

According to this system, the system requirements may be met, and the system cost may be reduced, by adding devices for the C-plane process and the U-plane process on an as-needed basis.

The above-described prior technique, however, is problematic in the points described below.

In dividing an RNC into a device for dealing with the C-plane (hereinafter referred to as a C-plane processing device) and a device for processing the U-plane (hereinafter referred to as a U-plane processing device), the cell information which only should be held in one RNC so far, have to be commonly set and held in both of the C-plane and U-plane processing devices. The cell information includes the information to be set on a cell-by-cell basis to identify a cell. The cell information includes the information established for every cell, for example, a cell ID, a local cell ID, etc., and a mobile country code (MCC), a mobile network code (MNC), a local area code (LAC), etc.

Moreover, when a cell is newly established or established in addition to already existing RNCs, it is required to set the cell information of both of the C-plane and U-plane processing devices, which complicates the operation. In addition, discordance can be introduced between the information items set in the C-plane and U-plane processing devices, so that the system will not operate normally. In such a case, it is conceivable that a great deal of effort will be wasted to find the discordance.

It is an object of the present invention to provide a radio access network that allows added or modified cell information to be reliably and easily set when a new cell is established additionally or newly, in the environment in which a radio network controller defined in the 3GPP is divided into the C-plane processing device and the U-plane processing device.

DISCLOSURE OF INVENTION

The method of setting cell information of the present invention is a method adapted to set cell information in a radio access network, in which a radio network controller accommodating at least one radio base station is physically divided into a control-plane processing device and at least one user-plane processing device, wherein the control-plane processing device deals with the control plane process and the user-plane processing device performs the user plane process under control of the control-plane processing device. The control-plane processing device holds in advance at least one item of cell information to be held in common with the user-plane processing device that is under control of the control-plane processing device. The user-plane processing device requests at least one said item of cell information to the control-plane processing device. The control-plane processing device notifies the user-plane processing device at least one said item of cell information to be held in common in both of the control-plane processing device and the user-plane processing device to the user-plane processing device. In this process, the user-plane processing device can request the cell information when a startup process is completed.

In another method of setting cell information of the present invention, the control-plane processing device holds in advance at least one item of cell information that is to be held in common with the user-plane processing device that is under control of the control-plane processing device. Next, the control-plane processing device decides which user-plane processing device will notify said at least one said item of cell information. Next, the control-plane processing device notifies the user-plane processing device that at least one said item of cell information will be held in common with that device.

BEST MODE FOR IMPLEMENTING THE PRESENT INVENTION

Explanation is presented regarding an embodiment of the present invention referring to the drawings.

Figure 2:
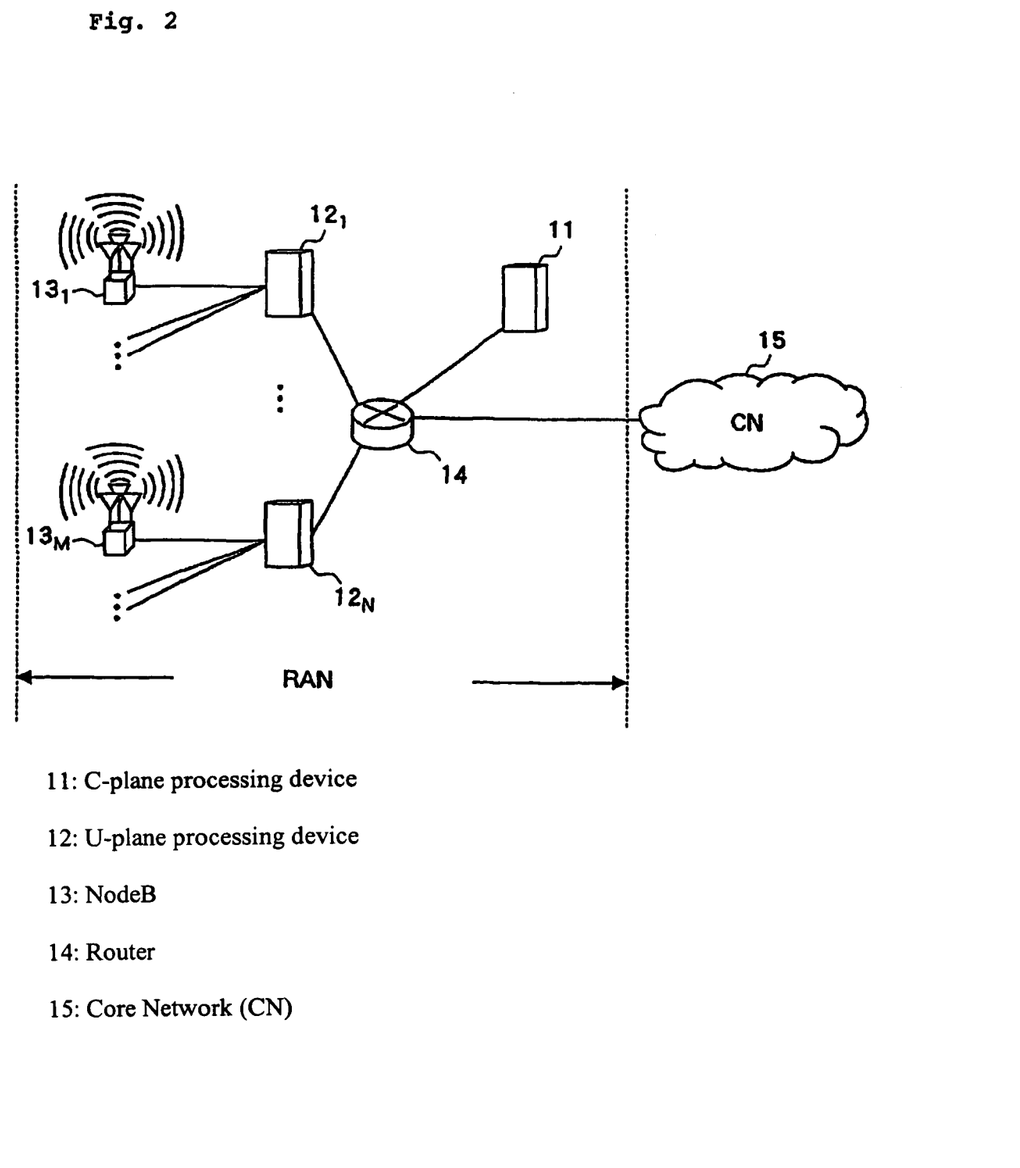
FIG. 2 is a diagram illustrating the architecture of the RAN of the present embodiment.

FIG. 2 is a diagram illustrating the architecture of the RAN (radio access network) of the present embodiment. Referring to FIG. 2, the RAN of the present embodiment has C-plane processing device 11, U-plane processing devices $12_1$ to $12_N$ and NodeBs $13_1$ to $13_M$. N and M are natural numbers.

C-plane processing device 11 and U-plane processing devices $12_1$ to $12_N$ are interconnected to each other through router 14. Router 14 is connected to CN (core network) 15.

While only one C-plane processing device 11 is shown here, a plurality of C-plane processing devices 11 can be connected to CN 15. At least one NodeB is connected to each of the U-plane processing devices.

In the present embodiment, an RNC (radio network controller) defined in 3GPP is divided into C-plane processing device 11 and U-plane processing devices $12_1$ to $12_N$.

C-plane processing device 11 performs the C-plane process in the RNC defined in 3GPP. Specifically, C-plane processing devices 11 sends and receives control signals for signaling control with mobile stations (not shown) and performs establishment and release of calls.

Each of U-plane processing devices $12_1$ to $12_N$ performs the U-plane process in the RNC defined in 3GPP.

Specifically, each of U-plane processing devices $12_1$ to $12_N$ controls NodeB under control thereof and sends and receives user data with mobile stations (UEs, not shown in the figure). Each of U-plane processing diveces $12_1$ to $12_N$ is mounted with an NBAP (NodeB application part). Furthermore, each U-plane processing device $12_1$ to $12_N$, when providing a paging service, decides on a NodeB to send a paging signal.

It is necessary for each U-plane processing device $12_1$ to $12_N$ to hold various cell information in order to perform the NBAP procedures or in order to determine the NodeB to which a paging signal is to be sent. The cell information that has to be held in each U-plane processing device $12_1$ to $12_N$ includes Mobile Country Code (MCC), Mobile Network Code (MNC) and Location Area Code (LAC) in addition to Cell ID, Local Cell ID, etc. that are set up for every cell. These items of cell information are also to be held in C-plane processing device 11.

Thus, it is necessary for C-plane processing device 11 to hold all the items of the cell information to be held in common with each U-plane processing device $12_1$ to $12_N$ that are assigned to be under control of C-plane processing device 11. Thus, when any of U-plane processing devices $12_1$ to $12_N$ under control of C-plane processing device 11 starts up, C-plane processing device 11 transmits the cell information necessary for the started-up U-plane processing devices 12. Each of U-plane processing devices $12_1$ to $12_N$ acquires the cell information from C-plane processing device 11 when starting up, and thereafter operates by making use of the acquired cell information.

Each of NodeBs $13_1$ to $13_M$ covers at least one cell and is connected with mobile stations through a radio interface. NodeBs $13_1$ to $13_M$ terminate the radio interfaces and transmit user data to U-plane processing devices.

Router 14 interconnects between C-plane processing device 11, U-plane processing devices $12_1$ to $12_N$ and CN 15 and handles the routing of user data and control signals.

CN 15 is a network for providing circuit switching and packet switching services.

Figure 3:
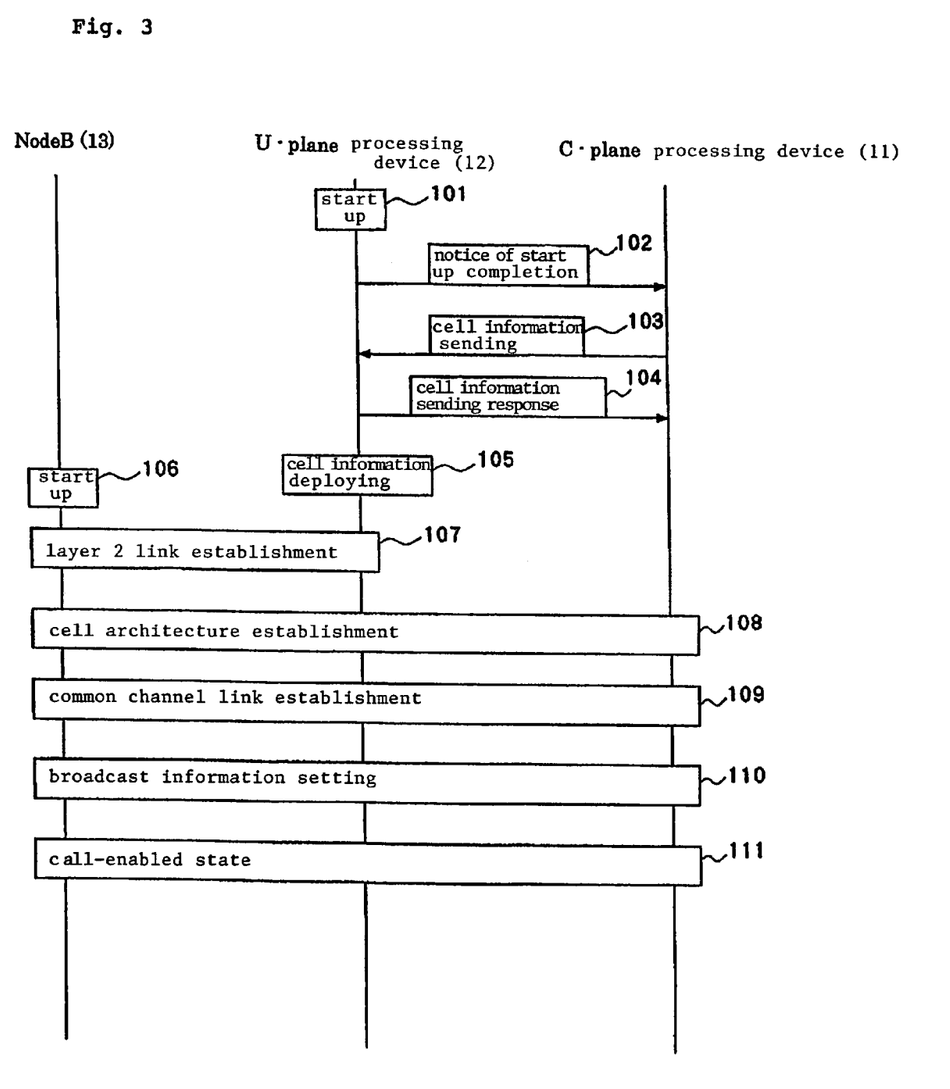
FIG. 3 is a sequence diagram representing the operation of the U-plane processing device in the RAN of the present embodiment when the U-plane processing device starts up.

FIG. 3 is a sequence diagram representing the operation of the U-plane processing device in the RAN of the present embodiment when the U-plane processing device starts up. Referring to FIG. 3, when U-plane processing device 12 completes startup as a stand-alone device (step 101), U-plane processing device 12 sends a notice of startup completion to C-plane processing device 11 (step 102.) When receiving the notice of startup completion, the C-plane processing device 11 sends necessary items of the cell information to the U-plane processing device 12 (step 103.)

When receiving the cell information, U-plane processing device 12 sends a reply to C-plane processing device 11 (step 104) and deploys the cell information received from C-plane processing device 11 in its own memory table (step 105.) The memory table is formed, for example, in nonvolatile memory.

FIG. 4 is a diagram illustrating an aspect of the memory table on which cell information is deployed. Referring to FIG. 4(a), it is shown that the cell information of cell #1- and cell #2 has been set in the memory table before deployment of the cell information received from C-plane processing device 11. Now, on deployment of the cell information received from C-plane processing device 11, the cell information of cell #3 is added and LAC of cell #2 is changed from E' to E, as shown in FIG. 4(b). In this way, U-plane processing device 12 correctly grasps the information about the cells and NodeBs to be placed under control of U-plane processing device 12 itself and is placed in the state that is able to perform the NBAP processing and to decide the destination cell for paging. In this regard, however, because NodeB 13 has not yet been booted, the RAN did not attain a call-enabled state.

Thereafter, when NodeB 13 under control of U-plane processing device 12 is booted (step 106), U-plane processing device 12 establishes a Layer-2 link to NodeB 13 by reference to the cell information (step 107.)

Then, in NodeB 13, U-plane processing device 12 and C-plane processing device 11, cell architectures are established (step 108), links of common channels are set up (step 109), broadcast information is set (step 110) and the call-enabled state is established in the entire RAN system (step 111).

As described above, in the present embodiment, the cell information needed to be set in common in both C-plane processing device 11 and U-plane processing devices 12 as a consequence of the physical separation of an RNC, as defined in 3GPP, into C-plane processing device 11 and a plurality of U-plane processing devices $12_1$ to $12_N$ are held in advance in C-plane processing device 11. When U-plane processing devices $12_1$ to $12_N$ are booted, cell information is notified from C-plane processing device 11 to U-plane processing devices $12_1$ to $12_N$. As a result, it becomes unnecessary to set the cell information individually in each of U-plane processing devices $12_1$ to $12_N$ in the course of Establishing a new cell or establishing a cell in addition to the already existing RNCs, thereby obviating the discordance of the setting between C-plane and U-plane devices and further enabling easy and reliable establishment of the cell information. Thereby, when performing an operation that involves a change in the cell information, for example, start-up of a radio access network, additional establishment of a radio base station or a cell, change in a network architecture, and change in the cell information, it becomes unnecessary to set cell information in U-plane processing devices $12_1$-$12_N$ in which the number of devices is larger compared with C-plane processing device 11, thereby improving the efficiency of the work operation and further enabling completing the work operation reliably in a short time. Moreover, because U-plane processing devices $12_1$ to $12_N$ individually obtain necessary cell information from C-plane processing device 11 during start-up, U-plane processing devices $12_1$ to $12_N$ need, by default, only minimal information items required for booting up, and do not require any individual setting when manufactured or before installation thereby promoting the efficiency of the work operation.

For reference, in a call-enabled state, when receiving a request for paging transmission from C-plane processing device 11, U-plane processing device 12 consults the memory table shown in FIG. 4 referring to LAI (Location Area Identity) that is included in the request for paging transmission and decides on the NodeB and cell to transmit the paging. On this occasion, the LAI is represented by MCC, MNC and LAC in FIG. 4, and thus U-plane processing device 12 decides to send the paging to the cell identified by the same LAI. LAI refers to the identifying information of the region of the paging, i.e. the area in which broadcast paging is executed.

As an additional remark, in the present embodiment, while it is intended that C-plane processing device 11 notifies the cell information to U-plane processing device 12, when receiving a notice of the completion of boot up from U-plane processing device 12, it is also permissible that U-plane processing device 12 requests the cell information from C-plane processing device 11 based on need independently of the completion of boot up. Thereby, U-plane processing device 12 can acquire the information from C-plane processing device 11 as need arises, and thus can maintain the state of holding appropriate information without resetting.

Alternatively, while in the RAN of the present embodiment, it is intended that the cell information is notified from C-plane processing device 11 when U-plane processing device 12 is booted up, it is also permissible that the cell information is notified from C-plane processing device 11 based on the voluntary decision of C-plane processing device 11 independent of the boot up of U-plane processing device 12. In addition, notification of the cell information can be supplied to all or a plurality of U-plane processing devices $12_1$ to $12_N$ at one time, or alternatively can be supplied individually to U-plane processing devices $12_1$ to $12_N$.

As a result, when the cell information is updated by an operator's request etc., it becomes unnecessary to go and to set the cell information individually at the places where U-plane processing devices $12_1$ to $12_N$ are installed, thereby making update of the cell information easy.

Furthermore, in the present embodiment, while it is intended that cell information is notified without fail from C-plane processing device 11 when U-plane processing device 12 boots up, the present invention is not limited to such procedures. If the appropriate cell information is deployed in nonvolatile memory in U-plane processing device 12, then acquiring the cell information at the time of boot-up is not necessarily needed. In this case, it is permissible for U-plane processing device to decide whether or not to request the cell information from C-plane processing device based on the cause for the boot-up: U-plane processing device 12 requests the cell information from C-plane processing device 11, for example, in the case when U-plane processing device 12 is boot up without having the cell information stored in the memory table, and does not request the cell information from C-plane processing device 11 if U-plane processing device 12 is booted up having the cell information stored in the memory table. Further, if U-plane processing device 12 is rebooted on account of a serious failure, U-plane processing device 12 requests the cell information to C-plane processing device 11 even if the cell information is present on the memory table.

The invention claimed is:

1. A method of setting cell information to set cell information in a radio access network provided with a radio network controller accommodating at least one radio base station, said radio network controller being physically divided into a control-plane processing device and at least one user-plane processing device, wherein said control-plane processing device performs the control plane process, and said user-plane processing device performs the user plane process under control of said control-plane processing device, comprising:

a first step of holding in advance at least one item of cell information in said control-plane processing device, said cell information being the information to be held in common with said user-plane processing device that is under control of said control-plane processing device, a second step of requesting said cell information from said user-plane processing device to said control-plane processing device, and a third step of notifying said cell information to be held in common in both of said control-plane processing device and said user-plane processing device from said control-plane processing device to said user-plane processing device that has requested said cell information.

2. A method of setting cell information according to claim 1, wherein said user-plane processing device requests said cell information when its startup process is completed in the second step.

3. A method of setting cell information according to claim 1, wherein said cell information includes the information to be set with regard to every cell to be covered by said radio base station.

4. A method of setting cell information according to claim 3, wherein said cell information notified in said third step is deployed in said user-plane processing device on a cell-by-cell basis.

5. A method of setting cell information to set cell information in a radio access network provided with a radio network controller accommodating at least one radio base station, said radio network controller being physically divided into a control-plane processing device and at least one user-plane processing device, wherein said control-plane processing device deals with the control plane process, and said user-plane processing device performs the user plane process under control of said control-plane processing device, comprising:

a first step of holding at least one item of cell information in said control-plane processing device in advance, said cell information being the information to be held in common with said user-plane processing device that is under control of said control-plane processing device, a second step of said control-plane processing device to decide on the user-plane processing device to transmit said cell information, and a third step of notifying said cell information, to be held in common in both of said control-plane processing device and said user-plane processing device, from said control-plane processing device to said user-plane processing device to which said cell information is to be sent.

6. A method of establishing cell information according to claim 5, wherein said cell information includes the information item established with regard to every cell to be covered by said radio base station.

7. A method of establishing cell information according to claim 6, wherein said cell information notified in said third step is deployed in said user-plane processing device on a cell-cell basis.

8. A radio access network having a radio network controller for controlling at least one radio base station, said radio network controller being physically divided into a device that deals with the control plane process and at least one device that performs the user-plane process, comprising:
    at least one user-plane processing device that takes partial charge of the process to be executed by said user-plane under control of said device that deals with the process to be executed by a control plane, and
    a control-plane processing device that takes partial charge of said control plane process, holds in advance at least one item of cell information to be held in common with said at least one user-plane processing device that is under control of the control-plane processing device, and when said cell information is requested from any of said at least one user-plane processing device, notifies the item of cell information to be held in common with said relevant user-plane processing device to the relevant user-plane processing device.

9. A radio access network according to claim 8, wherein said user-plane processing device requests cell information when completing startup processing.

10. A radio access network according to claim 8, wherein said cell information is the information set with regard to every cell covered by said radio base station.

11. A radio access network according to claim 10, wherein said user-plane processing device deploys said cell information notified from said control-plane processing device on a cell-by-cell basis.

12. A radio access network having a radio network controller for controlling at least one radio base station, said radio network controller being physically divided into a device that deals with the process of a control plane, and at least one device that performs the process of an user-plane, comprising:
    at least one user-plane processing device that takes charge of the process of said user-plane under control of said device that deals with the control plane process, and
    a control-plane processing device that takes charge of said control plane process, holds in advance at least one item of cell information to be held in common with said user-plane processing device that is under control of said control-plane processing device, decides a user-plane processing device to notify said cell information, and notifies said cell information to be held in common with the relevant user-plane processing device to the relevant user-plane processing device.

13. A radio access network according to claim 12, wherein said cell information is the information to be set on a cell-by-cell basis with regard to the cells covered by said radio base station.

14. A radio access network according to claim 13, wherein said user-plane processing device deploys said cell information notified from said control-plane processing device on a cell-by-cell basis.

15. A radio network controller, physically divided into a device that deals with the process of a control plane and at least one device that performs the process of a user-plane, and adapted for controlling a radio base station, comprising
    at least one user-plane processing device that takes charge of the process of said user-plane under control of said device that deals with the process of said control plane, and
    a control-plane processing device that takes charge of said process of said control plane, holds in advance cell information to be held in common with said at least one user-plane processing device and when any of said at least one user-plane processing device requests notifying said cell information, notifies the item of cell information to be held in common with said relevant user-plane processing device to said relevant user-plane processing device.

16. A radio network controller according to claim 15, wherein said user-plane processing device requests cell information when completing its startup process.

17. A radio network controller according to claim 15, wherein said cell information includes the information set on a cell-by-cell basis with regard to the cells covered by said radio base station.

18. A radio network controller according to claim 17, wherein said user-plane processing device deploys said cell information notified from said control-plane processing device on the cell-by-cell basis.

19. A radio network controller, physically divided into a device that deals with the process of a control plane and at least one device that performs the process of a user-plane, and controlling a radio base station, comprising
    at least one user-plane processing device that takes charge of the user plane process under control of said device that deals with the control plane process, and
    a control-plane processing device that takes partial charge of said control plane process, holds in advance at least one item of cell information to be held in common with said user-plane processing device that is under control of the control-plane processing device, decides a user-plane processing device to notify said cell information and notifies said cell information to be held in common with said relevant user-plane processing device to the relevant user-plane processing device.

20. A radio network controller according to claim 19, wherein said cell information includes the information set on a cell-by-cell basis with regard to the cells covered by said radio base station.

21. A radio network controller according to claim 20, wherein said user-plane processing device deploys said cell information notified from said control-plane processing device on the cell-by-cell basis.

22. A control-plane processing device included in a radio access network that has a radio network controller for controlling at least one radio base station, said radio network controller being physically divided into a device that deals with the process of a control plane and at least one device that performs the process of a user-plane under control of said device that deals with the process of said control plane, and said control-plane processing device being adapted to take charge of the process of said control plane, characterized in that
    said control-plane processing device holds in advance at least one item of cell information to be held in common with said at least one device that is under control of said control-plane processing device and takes charge of the process of said user-plane and when said cell information is requested from said device that takes charge of the process of said user-plane, notifies the item of cell information to be held in common with said device that takes charge of the process of said user-plane.

23. A control-plane processing device included in a radio access network that has a radio network controller for controlling at least one radio base station, said radio network controller being physically divided into a device that deals with the process of a control plane and at least one device that performs the process of a user-plane under control of said device that deals with the process of said control plane, and said control-plane processing device being adapted to take charge of the process of said control plane, characterized in that said control-plane processing device holds in advance at least one item of cell information to be held in common with said at least device that is under control of said control-plane processing device and takes charge of the process of said user-plane; decides a user-plane processing device to notify said cell information; and notifies said cell information to be held in common with said device that takes partial charge of the process of said user-plane to the relevant device that takes charge of the process of said user-plane.

24. A user-plane processing device included in a radio access network that has a radio network controller for controlling at least one radio base station, said radio network controller being physically divided into a device that deals with the process of a control plane and at least one device that performs the process of a user-plane under control of said device that deals with the process of said control plane, and said user-plane processing device being adapted to take charge of the process of said user plane, characterized in that said user-plane processing device acquires cell information from said device that takes partial charge of the process of said control plane, wherein said device that takes partial charge of the process of said control plane holds in advance at least one item of cell information, said cell information held in common with said user-plane processing device.

25. A user-plane processing device according to claim 24, wherein said user-plane processing device requests said cell information when completing its startup process.

26. A user-plane processing device according to claim 25, wherein said user-plane processing device deploys said cell information notified from said device that takes partial charge of the process of said control plane on a cell-by-cell basis with regard to the cells covered by the relevant radio base station.

* * * * *